June 28, 1966 — D. B. MORITZ — 3,258,236
CHILD'S COORDINATION TRAINING DEVICE
Filed March 10, 1964 — 4 Sheets-Sheet 1
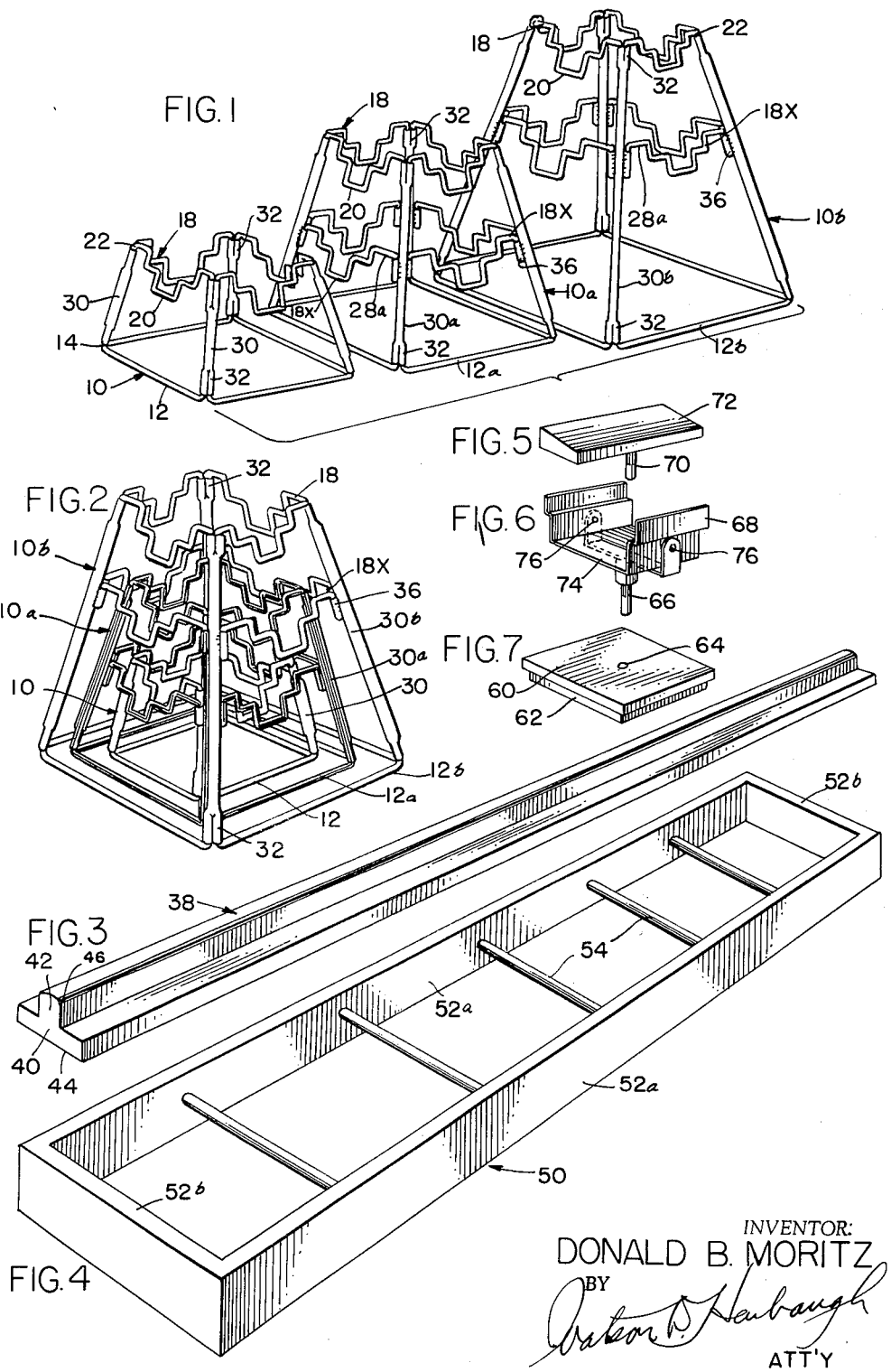
INVENTOR:
DONALD B. MORITZ
BY
ATT'Y June 28, 1966  D. B. MORITZ  3,258,236
CHILD'S COORDINATION TRAINING DEVICE
Filed March 10, 1964  4 Sheets-Sheet 2
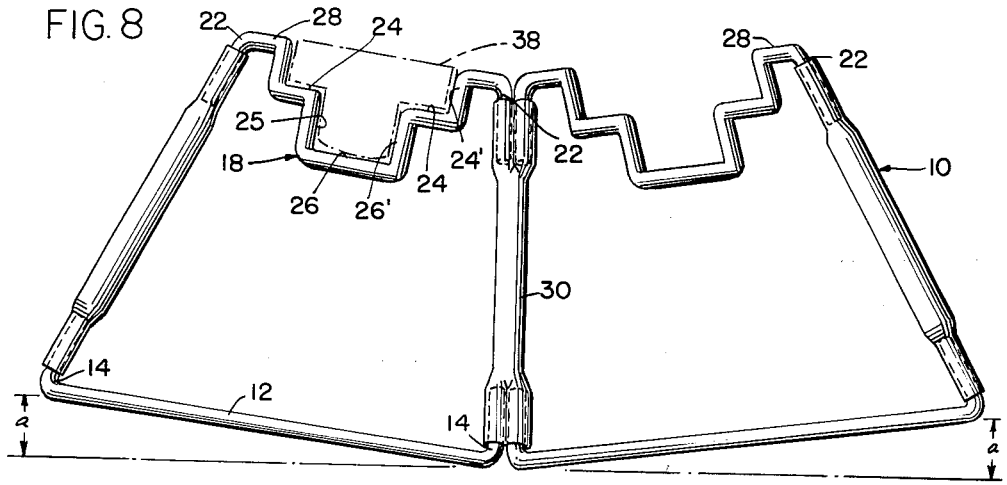
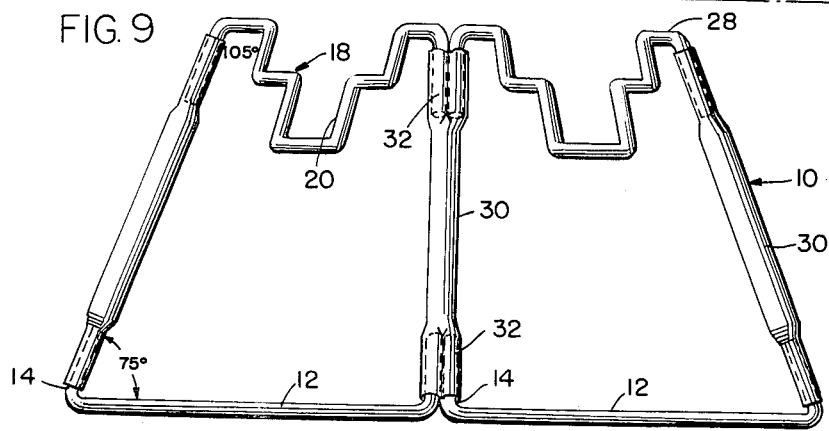
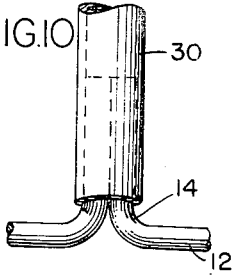
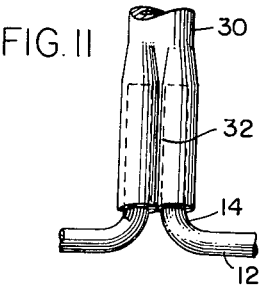
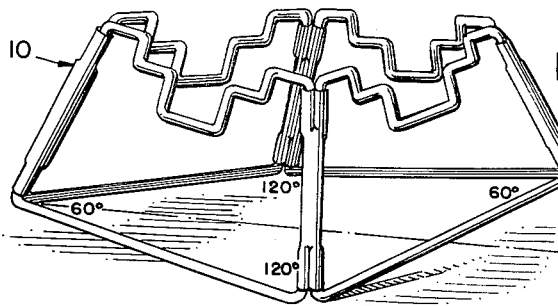
INVENTOR:
DONALD B. MORITZ
BY
ATT'Y

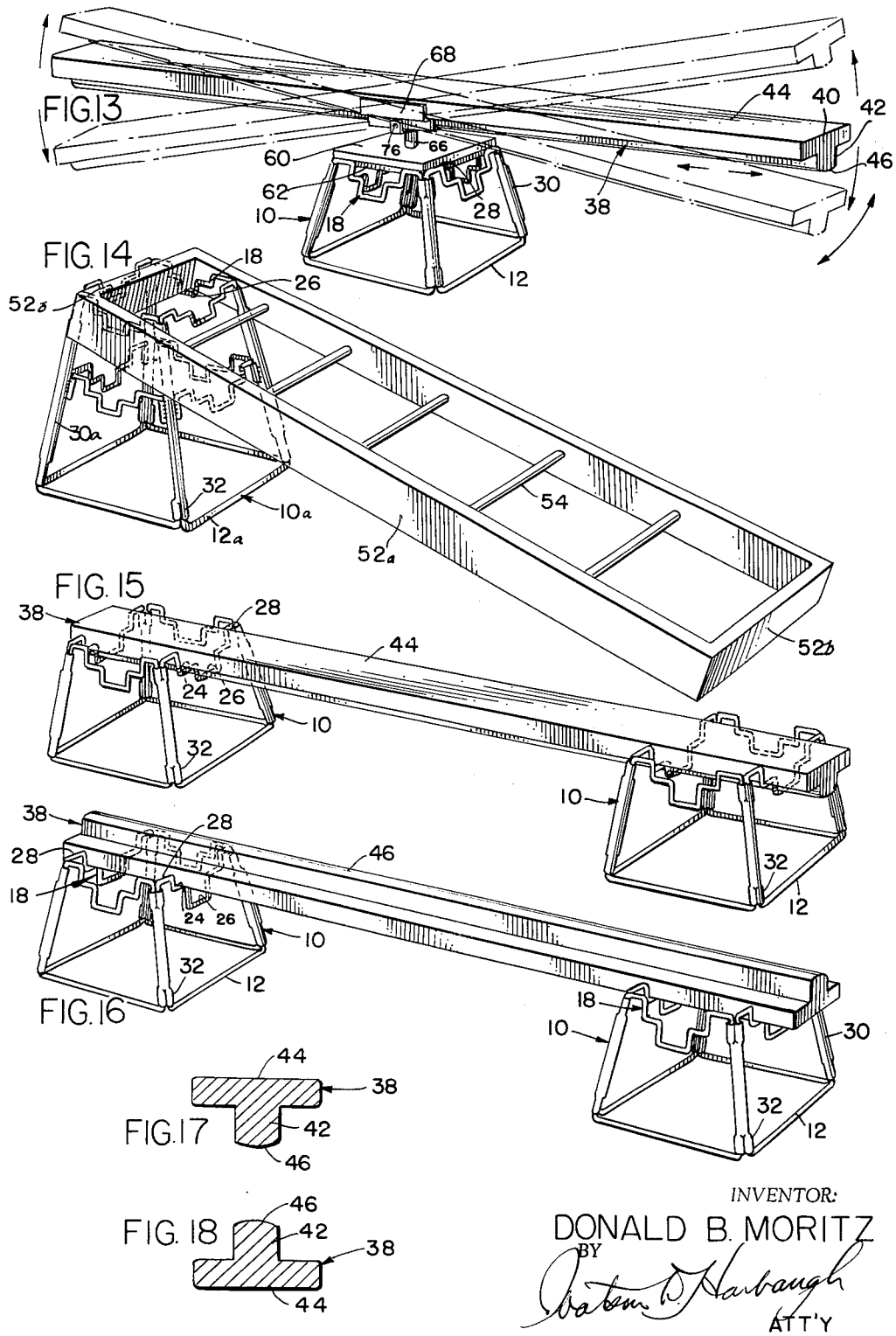

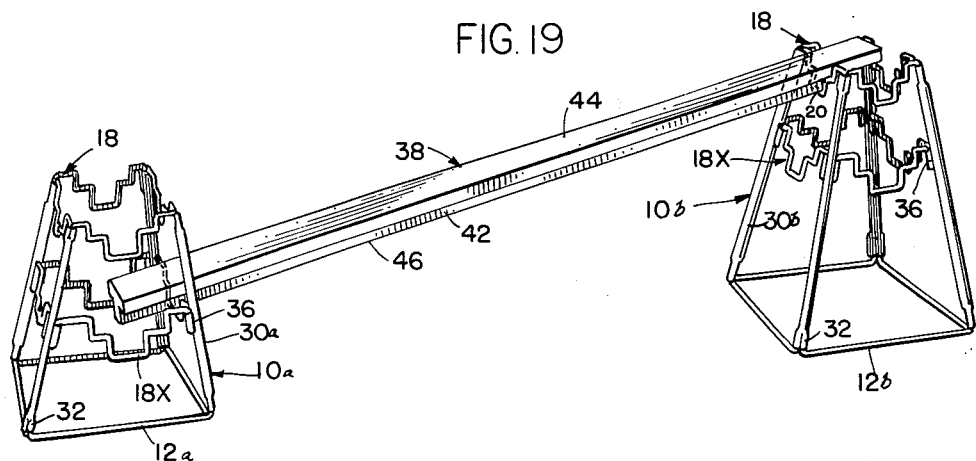
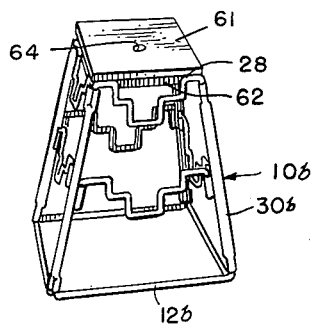
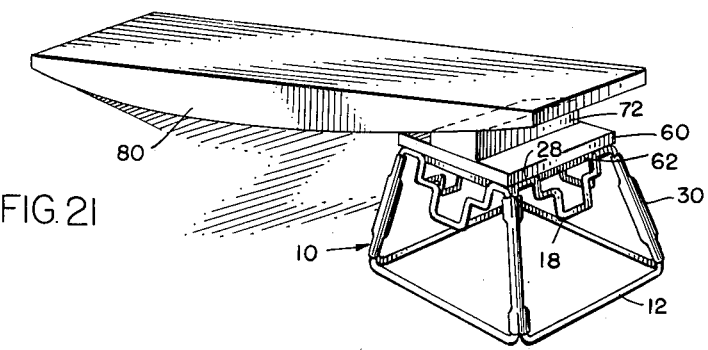

United States Patent Office 3,258,236
Patented June 28, 1966

3,258,236
CHILD'S COORDINATION TRAINING DEVICE
Donald B. Moritz, Arlington Heights, Ill., assignor, by mesne assignments, to Bliss & Laughlin Industries, Incorporated, Oak Brook, Ill., a corporation of Delaware
Filed Mar. 10, 1964, Ser. No. 350,901
5 Claims. (Cl. 248—127)

The present invention relates to educational devices for small children particularly of the preschool age for improving through physical exercise and play their perception, attentiveness and coordination with the result that other phases of learning ability are brought thereby to a higher level than would otherwise be present before starting to school.

The present invention has its roots in basic considerations of better preparing preschool children for assimilation of educational material that comes later so that the transition to school is greatly eased and more attention can be devoted to educational material in early school rather than take time from this learning to acclimate the child to learning processes. In brief, improve his school learning ability before he starts to school.

In human beings where sensory neurones respond to stimuli and convey nerve impulses to the brain for perception and understanding, and motor neurones convey responses controlled by the brain to muscles to provide physical activity, and where factors of attention and concentration affect this process as well as incentives, rewards, and increased confidence under pleasant conditions and endeavors, to mention a few of the complexes involved in learning, it has been found that there is a correlation between learning ineptness found in children in the early school years and underdeveloped physical coordination iin preschool children. Most deficiencies in reading, spelling and speech which appear later in the early school years are found in preschool children having poor physical coordination. If these deficiencies are not overcome in preschool years they have to be overcome in school years. This entails a retardation of both the individual and others in school that may persist many years thereafter. Experiments have shown that preschool improvements attained psychologically in motor responses involving coordination with sensory stimuli and perceptions induced thereby carry with them an improvement for other motor responses involved later in the assimilation of perceptual educational material.

In the present invention devices are provided which not only reveal physical objects and shapes perceived as a matter of interest by preschool children, but devices which also demonstrate how physical shapes become meaningful as being indicative of their usefulness to perform particular tasks. Whether it be the static sturdiness of a wide bottom stand, the stability of a three point or four point support that is adjusted for irregularities on supporting surfaces, or merely objects in motion, visual and tactual learning are advanced by observation and participation. To take a part in setting up a device and see it accomplished so that it can be put to useful work in a tactual, physical way, as controlled by coordinated motor responses of the child himself, brings sharp attention and a finality of perception that is followed by improved and more confident motor action for other learning tasks yet to come.

Improved preschool coordination involving the use of the hands and feet as guided by sensory perceptions of sight, sound and feeling also advances the coordination of the tongue with sight reading. This is preparatory to better reading in the school years yet to come.

Speech articulation, for instance, is directly influenced favorably in accuracy and elocution by other motor responses having been improved even though the other responses were nothing more than preschool walking a rail successfully with improved balance coordination where coordination was initially quite low.

This coordination is better improved during preschool years when there is a great deal of playtime available and little, if any, time is required of the child for pure education.

There is also coordination of action with perceptions in three dimensions and here deeper organizational appreciation of many perceptions must be assisted with a simplified device or object that has a wide variety of uses. Complex devices would only confuse and have an adverse effect. Also preschool use of a device with other units teaches attention to details and differences, thus expanding greatly a child's rational response for educational subjects in school regardless of how big or complex they may be in school.

Further advantages are attained by subjecting the child in play to nominal penalties such as mild pain for failures, and by inducing the child upon failure to recover himself with every muscular ability available to him with the assistance of tactual, visual and auditory perceptions instead of just one of them. Proficiency alone is, of course, a personal reward, but training leads to the drives of competitive awards thereby establishing a well rounded coordination in preschool years in the sensory-to perception-to response cycle long before reading and writing is reached.

Accordingly, an object of the invention also is to provide such a device which satisfies all personal ability levels of a child and still has greater opportunities for superior endeavors in three dimensional problems.

The invention is characterized by a three dimensional figure changeable in shape for a wide range of purposes, and organized as a permanent assembly involving geometric laws as well as being useful for physical exercise individually and with associated elements.

Another object is to provide a child's educational stand which can be used for menial tasks that are useful to people of any age group in addition to having additional educational significance to children when so used.

Another object of the invention is to provide a device of the character described which can be used outdoors as well as indoors with safety and without damage from weather and use, and which represents perception and coordination problems in both environments, thereby, for one thing, not being a seasonable device.

Devices embodying the invention can be put to other everyday uses or conveniently stored in very little space and can be hung on a wall or otherwise put away when not in use.

A further object of the invention is to provide a device of varying usages and variable contours which is easily moved or handled by a child, and is rugged and stable, easily and inexpensively manufactured, shipped and used, yet is useful in many other ways when no longer used for child education.

These being among the objects, other and further objects will become apparent from the description and the drawings relating thereto in which:

FIG. 1 illustrates in perspective the invention as embodied in stands of three sizes, FIG. 2 illustrates the three stands as nested for storage in shipment in one way other than by flattening them laterally, FIGS. 3 and 4 illustrate a tread rail and ladder respectively that are usable with the embodiment and top contour thereof, FIGS. 5, 6 and 7 illustrate in a vertical exploded view in perspective of accessories for the stand to provide further representation of other physical laws, FIG. 8 is a side elevation showing a stand embodying the invention flattened for storage against a wall, and includes a broken line showing of the cross-sectional contour of the walk rail in FIG. 3, FIG. 9 is an elevational view of the stand in fully expanded form for use on a flat surface, FIG. 10 shows the location of the associated elements at their assembly points prior to the manufacturing step in which the top and bottom elements are individually journaled as a unitized assembly with the uprights, FIG. 11 is a view of the parts as journaled ready for use, FIG. 12 illustrates how a modified frusto-pyramidal form can be made by partially flattening the stand to adapt same for stable support on an uneven surface, FIG. 13 illustrates in perspective a rotating teeter-totter made of the elements shown in FIGS. 3, 6, 7 and 9, FIG. 14 illustrates in perspective the element shown in FIG. 4 as used to provide inclined stepping stones or rungs, FIGS. 15 and 16 illustrate two stands used to support the rail of FIG. 3 as a wide and narrow track tread, respectively, FIGS. 17 and 18 show the orientation of the section configuration of the rail elements as used in FIGS. 15 and 16 respectively, FIG. 19 illustrates an arrangement similar to FIG. 15 in which the walk rail is inclined, FIG. 20 illustrates the combination of the element in FIG. 7 with a stand to provide a stool, and FIG. 21 illustrates the user of the elements in FIGS. 5, 7 and 9 with a bongo or rocker board as a broad walk-up incline.

The stand 10 which mainly embodies the invention is made preferably of rod and tubular stock of mild steel to provide an essentially frusto-pyramidal configuration as far as the edge contours are concerned with the top or bottom edge elements either defining a circle or a square with straight or concave lines on either the top or bottom thereof, or both. By way of example, but not by way of limitation, a pyramidal figure of straight lines is illustrated and preferred because it can fold flat for storage as well as nest easily with others like it when not folded.

Referring now to FIGS. 8, 9 and 10, rod stock ⅜" in diameter is cut to different predetermined lengths to provide horizontal elements for both the top and bottom. The ends of the bottom elements are bent upward and reversely to provide an inclined angle of approximately 75° with the intermediate portion thereby providing base elements 12 having upstanding journals 14 at their ends. Whether the base elements 12 are straight or curved they are designed to rest flatly on the ground or a floor 16 (FIG. 12).

The longer lengths form the shorter top elements 18. They are bent intermediate their ends to form a depending T-shaped recess 20 in the middle of the rod and bent at their ends downwardly to provide journals 22 defining an included angle of 105°. This angle is complementary to the 75° angle of the base journals 14 so that the journals 14 and 22 can be disposed in alignment one with the other. The T-shaped recess includes widespread shoulders 24 separated by a deeper portion 25 of the recess bottoming at 26. The sides of the recess are identified as 24' and 26' to assist in the description later herein of the operations of the recess 20. Aligned top portions 28 border the recess 20.

Assuming that the base and top elements 12 and 18 are disposed essentially parallel with each other and spaced a distance whereby the lower 14 and top journals 22 are in alignment, tubes 30 are cut of a length substantially the distance therebetween at the journals bends. The tubing has an inside diameter slightly in excess of twice the diameter of the journals and the journals at the respective corners are received in pairs in corresponding ends of the tubes as shown in FIG. 10. Thereupon, the sides of the tubes 30 are flattened over the length of the journals and upset or pinched down as at 32 to tighten around the journals separately as shown in FIG. 11. This is done at both the top and the bottom of the tubes.

This operation unitizes the assembly to form the stand 10 which is collapsible partially to the configuration shown in FIG. 12 or fully to a flat form as shown in FIG. 8. But, regardless of how it is handled, the top elements and the base elements cannot be extricated from the tube without great force or destruction. The angles mentioned are sufficient to prevent this by an angular interlocking relationship.

Furthermore, the overall area defined by the top elements in whatever shape the stand disposed is always smaller and vertically within the area defined by the base elements so that a stand is provided which will not tip with a downward load exerted thereon. This is of particular interest with respect to FIG. 12 where the shape is shown in which the stand is partially collapsed so that it will be steady on irregular ground as where a high point is accommodated at 34. The angles of 120° and 60° indicated in the drawing are representative but complementarily variable from 90° at each corner any amount necessary to accommodate the irregularity, and it should be noted that even without any irregularity, if one corner of the stand is up the remaining stand is stable as a three legged stand.

Referring to FIG. 1 the stand just described is shown at 10 where it is one of a group of three having different sizes. The tops are all alike and preferably the same size as indicated at 18. The differences are in the length of the base members 12a and 12b, as seen comparatively in FIG. 2, and the height of the tubular legs 30a and 30b. The angles of 75° and 105° remain the same.

In addition to the higher top 18a, the stand 10a is provided with rod elements 18x having like T-shaped recesses formed therein at the same height as in stand 10. And, it will be observed that the tallest stand 10b is provided with T-recessed rods at 18y which are like 18x and are disposed at the same level as the top 18a of the middle stand 10a. The rods 18x and 18y are longer at 28a than the rods 18 are at 28 but have the same journal and included angle of 105°. Short sleeve elements 36 are welded or brazed to the sides of the tubes 30a and 30b at the same distances from their top ends and the journals are slipped into place therein prior to the time that the upset or crimp 32 is made in the tops and bottoms of the tubes 10a and 10b (FIG. 11). All of the stands have the same flexibility and stability of shape and use and all can be collapsed to a flat condition for long storage or shipment whenever desired rather than nested as shown in FIG. 2.

Reference is now made to FIG. 3 where a tread rail 38 is shown having a T-shaped cross-sectional contour. The T contour of the rail mates with the T-contour of the recesses 20, 20a and 20b. The head portion 40 is almost thrice as wide as the face 46 on the leg portion 42 and the height is slightly less than the head width. The wide surface 44 on the bottom portion is flat and the narrow surface 46 on the leg portion is slightly and convexly rounded and disposed parallel to the bottom surface. The corner edges on all corners are slightly rounded to remove their sharpness. The rail is made of straight grain wood and is of any suitable length, preferably from 6 to 8 feet long and is finished with a non-toxic paint as are all the other parts being described, but in different colors.

As shown in FIG. 19 with two stands separated a little less than the length of a rail, the rail can be brought to rest in the recesses with its wide face up (FIGS. 15 and 17) and can be inclined from one level to another (FIG. 19) or disposed horizontally (FIGS. 15 and 16). Thus, it serves as a walk way from easy balancing practice or as a rest bench. It can also be inverted in the recesses to place the narrow surface 46 uppermost (FIGS. 3, 16 and 18) in which case a walk way presented which is more difficult for balance and coordination. The slight rounding on the narrow surface also strengthens the arch of the foot, and the flat portions on opposite sides are further corrective of pigeon-toed walking or outwardly turned toes. Thus, many effects are produced by these simple arrangements which vary perception and motor responses to broaden coordination efforts and experience including horizontal and vertical distances, flats and inclines of varying difficulty and choice by the child or children themselves, etc.

Reference is made to FIGS. 4 and 14 at this time to note a ladder-like accessory 50 comprising a heavy frame 52 with ladder rungs 54 therein. The frame is made up of approximately 2" x 4" lumber having two long sides 52a receiving the ends of the cross members including rungs 54 and two short end pieces 52b. The end pieces are receivable singly in the recesses 20 of one or more stands 10 doubly on the shoulders 24 if two ladders are supported end to end. The ends 52b are of limited length in order to have the sides 52a rest snugly against opposite sides of the stand without side play when the ends rest in opposite recesses. Thus, utmost stability and safe support against side slip or tipping is assured. The ladder can be inclined or disposed horizontally and can be used in walking erectly or "on all fours" with hands and feet in either position. This provides stepping-stone type distance perception and coordination and the judging of distances. This latter is a difficult problem which when solved by pre-school children provides a high degree of general as well as specific coordination. Using the accessory merely as a ladder has further value particularly in a utilitarian way.

Thus, with the rail 38 and ladder 50 as constructed and used with the stands, most of the stationary conditions are duplicated from which environmental perception and coordination are derived not only for individual participation, but group participation as well. This is distinguished from and is in addition to coordinations derived with moving objects such as balls, etc., which generally require two or more participants.

Reference is now made to FIGS. 4–7, 13 and 20 where a seat board type member 60 preferably made of plywood is provided. The member 60 is square to rest on top of the upper portions 28 of the stand 10 and is marginally offset or notched inwardly at its lower marginal edges to provide a lower portion 62 that is received within the confines of the upper portions 28 and held thereby against lateral movement. The seat board can easily be handled for application and removed by gripping the edge thereof within the confines of the slot 18. A hole 64 is provided at the center to receive rotatably therein either a vertical pin 66 of a teeter-totter yoke element 68 or a pin 70 (FIG. 5) which carries a wedge member 72. The yoke 68 supports a saddle 74 for rocking movement about pivots 76 and the saddle in turn has a shape mating with the rail 38 over the leg portion 42 of the T-shape as shown in FIG. 13. The rail is slidable endwise in the saddle to vary the leverage ratio of the rail as used for a teeter-totter. Thus, children can teeter-totter with the arrangement and also rotate same as a merry-go-round exhibiting centrifugal forces as well as inertial forces with the pin 66 journalled in the hole 64.

In FIG. 21 the yoke 68 is replaced by the wedge 72 and a bongo board 80 is mounted with one end on the wedge element to provide a ramp to walk up and down. Not only does the bongo board serve a separate purpose, but the stand in combination therewith serves in additional ways as an exercise element and as a ramp to reach the height of the tread rail when mounted in place in any one of three recesses 20 remaining available in the stand.

In all instances it will be noted that the base of the stand is wider in all directions than the area of weight application at the top thereof and being of the construction described, this obtains with any shape imposed upon the stand for rugged stability in use.

Moreover, it will be observed that as in FIG. 20 the stands and seat board make excellent stools in various heights as well as benches, when desired, as furniture when not otherwise being used or stored.

Having thus described the invention, the elements, their association and operation, it will be understood how the stated objects are attained and further results are accomplished, and how various and further modifications and arrangements can be made without departing from the spirit of the invention the scope of which is commensurate with the appended claims.

What is claimed is:

1. In a child's educational device a frusto-pyramidal stand comprising four tubular elements defining the corners of said stand, four U-shaped members elongated elements with upturned ends journalled in the lower ends of the tubes and forming the base thereof, and four inverted members having elongated elements with downwardly turned ends journalled in the upper ends of the tubes and forming a weight supporting top thereon.

2. The combination called for in claim 1 in which said downwardly turned ends define angles obtuse to their elongated elements and the upwardly turned ends define acute angles to their elongated elements that are complementary to the obtuse angles, whereby movement of a pair of diagonally opposite tubular members towards each other disposes the four elongated base elements in two planes intersecting each other at an obtuse angle.

3. In a child's educational device an essentially frusto-pyramidal stand comprising four tubular elements defining the corners of said stand, four U-shaped members having elongated elements with upturned ends supported in the lower ends of the tubes and forming the base thereof, four inverted members having elongated elements with downwardly turned ends supported in the upper ends and forming the top thereof, and four inverted members having elongated elements with inwardly turned ends, and means intermediate the ends of said tubular elements for supporting the last mentioned downwardly turned ends on the sides of the tubes, each of said inverted elements defining a downwardly extending essentially T-shaped recess in the middle thereof that faces upwardly.

4. The combination called for in claim 3 in which said downwardly turned ends define obtuse angles to their elongated elements and the upwardly turned ends define acute angles to their elongated elements that are complementary to the obtuse angle, whereby movement of a pair of diagonally opposite tubular members towards each other disposes the four elongated base elements in two planes intersecting each other at an obtuse angle.

5. The process of making a frusto-pyramidal child's educational stand comprising forming upstanding portions on the ends of elongated bottom elements disposed at acute angles with respect thereto and forming-depending portions on the ends of elongated top elements disposed at obtuse angles with respect thereto, inserting the obtuse portions in pairs in one end of large tubes and the acute portions in pairs in the other ends of the tubes with the tubes defining a frusto-pyramidal form, and crimping the ends of the tubes about the inserted pairs of said portions to journal them therein, each obtuse portion being in alignment with an acute portion to provide a unitary collapsible stand integrated against dismantling.

References Cited by the Examiner

UNITED STATES PATENTS

| | | | |
|---|---|---|---|
| 976,950 | 11/1910 | Tyner | 135—7.1 |
| 1,101,610 | 6/1914 | Allard | 256—64 |
| 1,238,142 | 8/1917 | Hitchcock | 126—29 |
| 1,559,064 | 10/1925 | Bitney | 248—154 |
| 1,704,199 | 3/1929 | Little | 248—127 |
| 1,734,804 | 11/1929 | Hatcher | 248—127 |
| 2,314,762 | 3/1943 | Boltz | 211—178 |
| 3,053,535 | 9/1962 | Gabrielson | 272—57 |
| 3,078,091 | 2/1963 | Burke | 272—30 |
| 3,107,913 | 10/1963 | Rouse | 272—30 |
| 3,113,400 | 12/1963 | Emond | 27—35 |
| 3,156,465 | 11/1964 | Jacobi | 272—57 |

FOREIGN PATENTS 24,561 10/1913 Great Britain.

CLAUDE A. LE ROY, *Primary Examiner.*

RICHARD C. PICKHAM, *Examiner.*

F. B. LEONARD, *Assistant Examiner.*